United States Patent
Caple

[11] Patent Number: 6,000,487
[45] Date of Patent: Dec. 14, 1999

[54] SNOWMOBILE EMERGENCY BRAKE

[76] Inventor: Steven L. Caple, 45855 Highway 6 - #57, Glenwood Springs, Colo. 81601

[21] Appl. No.: 09/090,173

[22] Filed: Jun. 4, 1998

[51] Int. Cl.$^6$ .................................................. B62M 27/02
[52] U.S. Cl. .............................. 180/190; 180/335; 74/488
[58] Field of Search ..................... 180/190, 315, 180/335, 333; 74/488, 489, 502

[56] References Cited

U.S. PATENT DOCUMENTS

| | | | |
|---|---|---|---|
| 3,521,718 | 7/1970 | Masoka et al. | 180/9.64 |
| 3,536,153 | 10/1970 | Bombardier | 180/190 |
| 3,684,045 | 8/1972 | Samuelson | 180/190 |
| 3,825,092 | 7/1974 | Graydon et al. | 180/272 |
| 3,938,613 | 2/1976 | Raborn | 180/272 |
| 3,957,131 | 5/1976 | Perkins | 180/272 |
| 4,362,524 | 12/1982 | Lob et al. | 474/88 |
| 4,520,890 | 6/1985 | Marier | 180/193 |
| 5,642,788 | 7/1997 | Mabbott | 180/272 |

*Primary Examiner*—Lanna Mai
*Assistant Examiner*—Andrew J. Fischer

[57] ABSTRACT

An emergency brake is provided for use with a snowmobile with a braking mechanism for precluding movement of the snowmobile upon the actuation thereof. Also included is a tether worn by a rider of the snowmobile. A release mechanism is coupled to the braking mechanism and the tether for actuating the braking mechanism upon the rider inadvertently falling off the snowmobile.

5 Claims, 3 Drawing Sheets

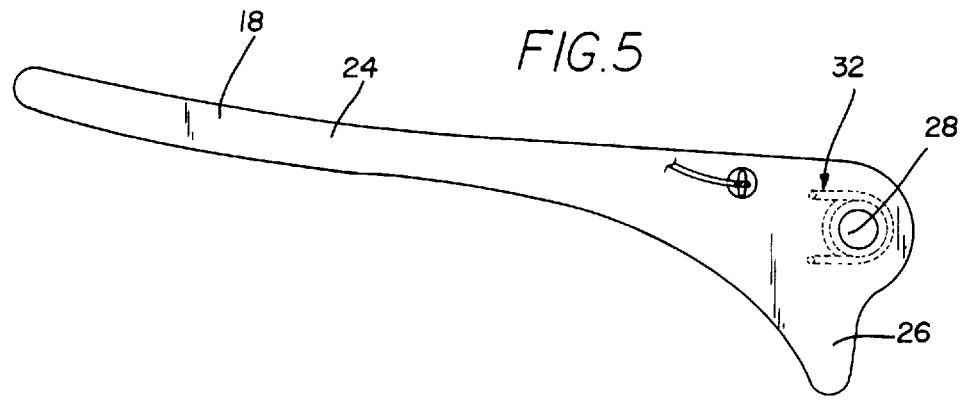
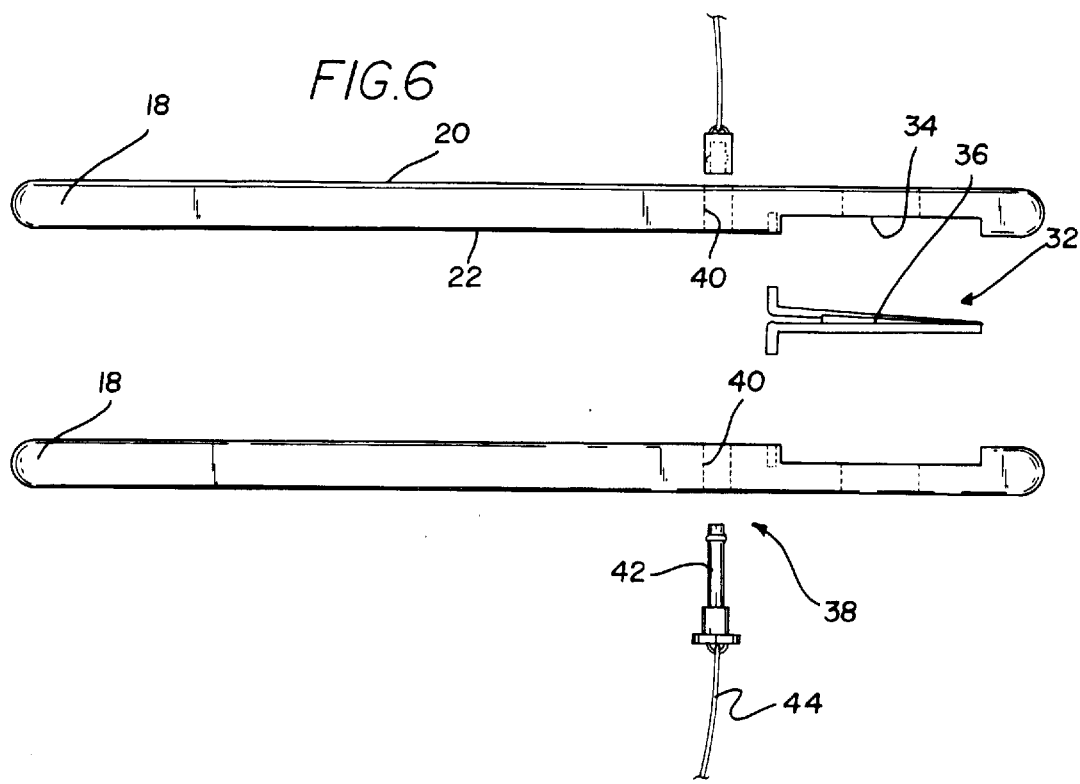

SNOWMOBILE EMERGENCY BRAKE

BACKGROUND OF THE INVENTION

1. Field of the Invention

The present invention relates to engine cut off systems and more particularly pertains to a new snowmobile emergency brake for immobilizing a snowmobile upon a rider inadvertently dismounting the same.

2. Description of the Prior Art

The use of engine cut off systems is known in the prior art. More specifically, engine cut off systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art engine cut off systems and the like include U.S. Pat. No. 3,938,613; U.S. Pat. No. 4,539,452; U.S. Pat. No. 4,520,890; U.S. Pat. No. 4,362,524; U.S. Pat. No. 5,299,466; and U.S. Pat. No. Des. 244,870.

In these respects, the snowmobile emergency brake according to the present invention substantially departs from the conventional concepts and designs of the prior art, and in so doing provides an apparatus primarily developed for the purpose of immobilizing a snowmobile upon a rider inadvertently dismounting the same.

SUMMARY OF THE INVENTION

In view of the foregoing disadvantages inherent in the known types of engine cut off systems now present in the prior art, the present invention provides a new snowmobile emergency brake construction wherein the same can be utilized for immobilizing a snowmobile upon a rider inadvertently dismounting the same.

The general purpose of the present invention, which will be described subsequently in greater detail, is to provide a new snowmobile emergency brake apparatus and method which has many of the advantages of the engine cut off systems mentioned heretofore and many novel features that result in a new snowmobile emergency brake which is not anticipated, rendered obvious, suggested, or even implied by any of the prior art engine cut off systems, either alone or in any combination thereof.

To attain this, the present invention is adapted for use with a snowmobile having a motorized treaded belt and a hydraulic brake for precluding the movement of the treaded belt upon the actuation thereof. The snowmobile further includes a handle assembly with a grip. A spring biased push button is mounted on the handle assembly adjacent to an inboard end of the grip for actuating the hydraulic brake upon the depression thereof. FIGS. 3–6 show a pair of gripping levers each with an arcuate outer surface, a planar inner surface and a periphery formed therebetween. As shown in FIGS. 4 & 5, the periphery defines a thin, elongated arcuate gripping portion and an engagement portion. Each gripping lever has a pivoting aperture formed between the gripping portion and engagement portion. Such pivoting aperture is adapted for being pivotally mounted to a bracket. This bracket is in turn coupled to the inboard end of the grip of the snowmobile. In operation, the inner surfaces of the gripping levers are in slidable abutment. Further, the gripping levers are each independently pivotally between a first orientation and a second orientation. In the first orientation, the gripping portion of the gripping lever is spaced from the grip and the engagement portion is out of engagement with the push button. In the second orientation, the gripping abuts the grip and the engagement portion resides in engagement with the push button for depressing the same. FIG. 6 shows a spring assembly including a pair of recesses formed in the inner faces of the gripping levers. Such recesses are formed about the pivoting aperture of the gripping levers for defining a compartment. A coil spring is situated within the compartment with a pair of ends each connected to a distinct one of the gripping levers. The coil spring functions for urging the gripping levers out of alignment such that one of the gripping levers is urged into the second orientation. Next provided is a trigger assembly including a pair of bores formed in the gripping levers. A pin is removably situated within the bores for maintaining both the gripping levers in alignment and in the first orientation thereof. Upon a rider falling off the snowmobile, a tether connected between the pin and the rider removes the pin.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new snowmobile emergency brake apparatus and method which has many of the advantages of the engine cut off systems mentioned heretofore and many novel features that result in a new snowmobile emergency brake which is not anticipated, rendered obvious, suggested, or even implied by any of the prior art engine cut off systems, either alone or in any combination thereof.

It is another object of the present invention to provide a new snowmobile emergency brake which may be easily and efficiently manufactured and marketed.

It is a further object of the present invention to provide a new snowmobile emergency brake which is of a durable and reliable construction.

An even further object of the present invention is to provide a new snowmobile emergency brake which is susceptible of a low cost of manufacture with regard to both materials and labor, and which accordingly is then susceptible of low prices of sale to the consuming public, thereby making such snowmobile emergency brake economically available to the buying public.

Still yet another object of the present invention is to provide a new snowmobile emergency brake which provides in the apparatuses and methods of the prior art some of the advantages thereof, while simultaneously overcoming some of the disadvantages normally associated therewith.

Still another object of the present invention is to provide a new snowmobile emergency brake for immobilizing a snowmobile upon a rider inadvertently dismounting the same.

Even still another object of the present invention is to provide a new snowmobile emergency brake for use with a snowmobile having a braking mechanism for precluding movement of the snowmobile upon the actuation thereof. Also included is a tether worn by a rider of the snowmobile. A release mechanism is coupled to the braking mechanism and the tether for actuating the braking mechanism upon the rider inadvertently falling off the snowmobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top view of the gripping levers of the embodiment of FIG. 3 shown separated from the snowmobile.

FIG. 6 is a side exploded view of the present invention showing the gripping levers and spring detached.

DESCRIPTION OF THE PREFERRED EMBODIMENT

Figure 1:
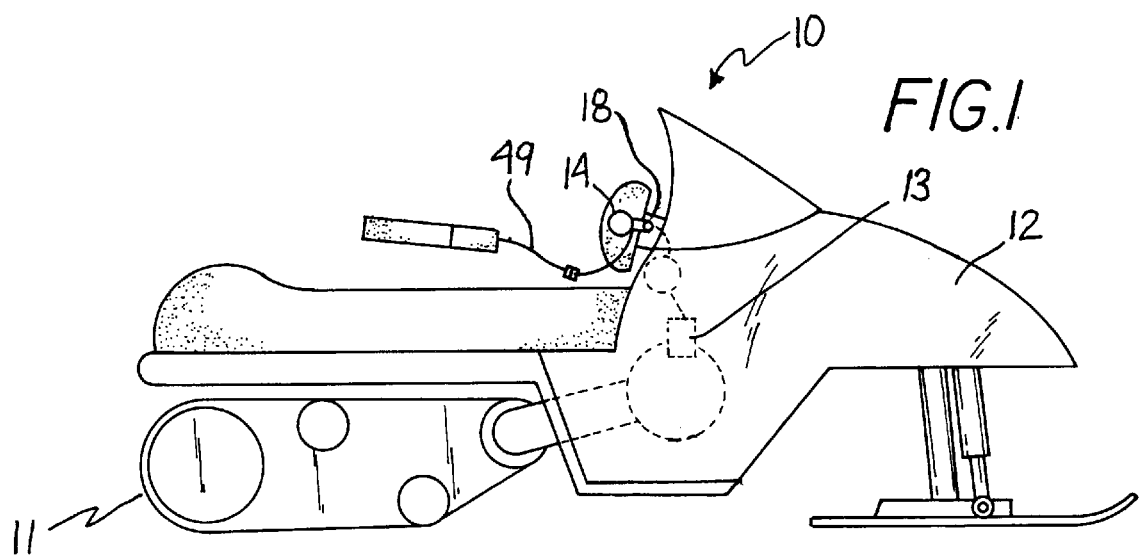
FIG. 1 is a side view of one of the embodiments of the present invention.
Figure 2:
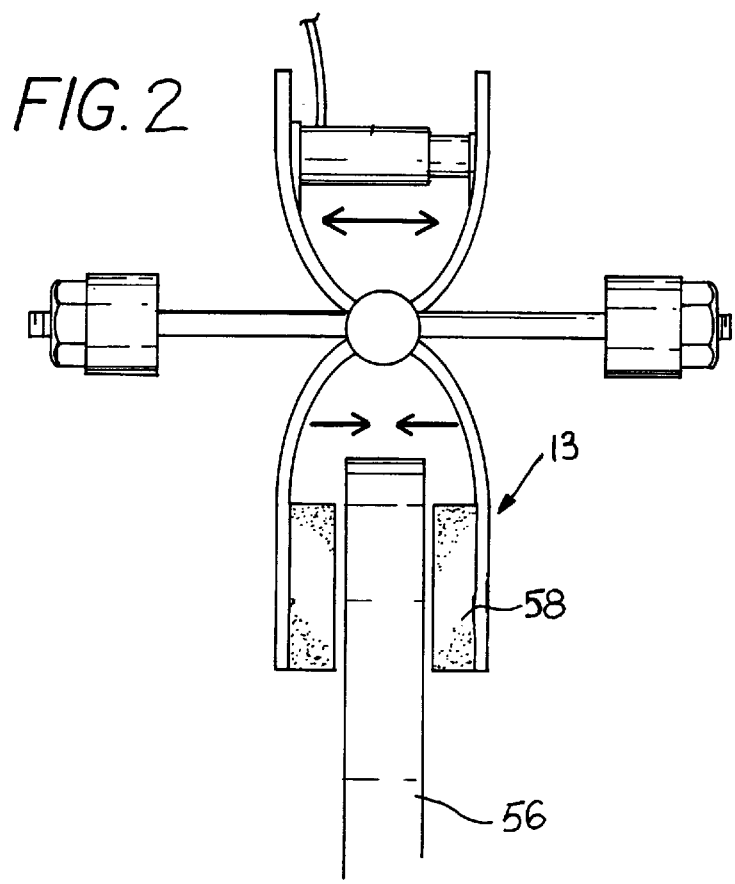
FIG. 2 is an exploded view of the embodiment of the present invention shown in FIG. 1.
Figure 3:
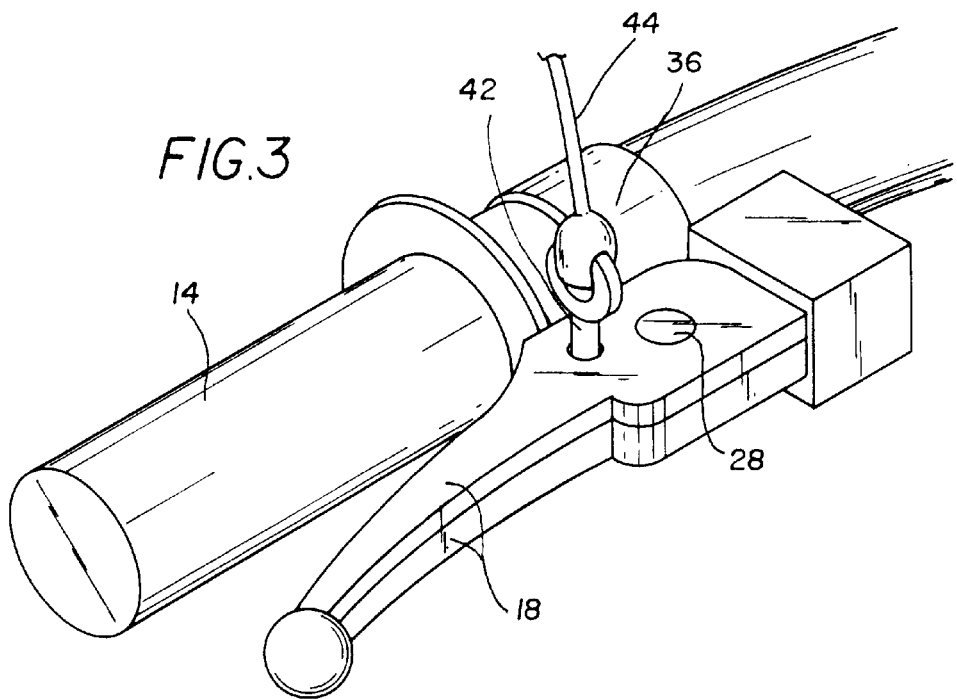
FIG. 3 is a perspective view of another embodiment of the present invention.

With reference now to the drawings, and in particular to FIGS. 1 through 6 thereof, a new snowmobile emergency brake embodying the principles and concepts of the present invention and generally designated by the reference numeral 10 will be described.

As best illustrated in FIGS. 1 through 6, the snowmobile emergency brake is adapted for use with a snowmobile 12 having a motorized treaded belt 11 and a hydraulic brake 13 for precluding the movement of the treaded belt upon the actuation thereof by the engagement of brake pads 58 to a flywheel 56 that is in communication with the treaded belt. The snowmobile further includes a handle assembly with a grip 14. A spring biased push button 16 is mounted on the handle assembly adjacent to an inboard end of the grip for actuating the hydraulic brake upon the depression thereof.

Figure 4:
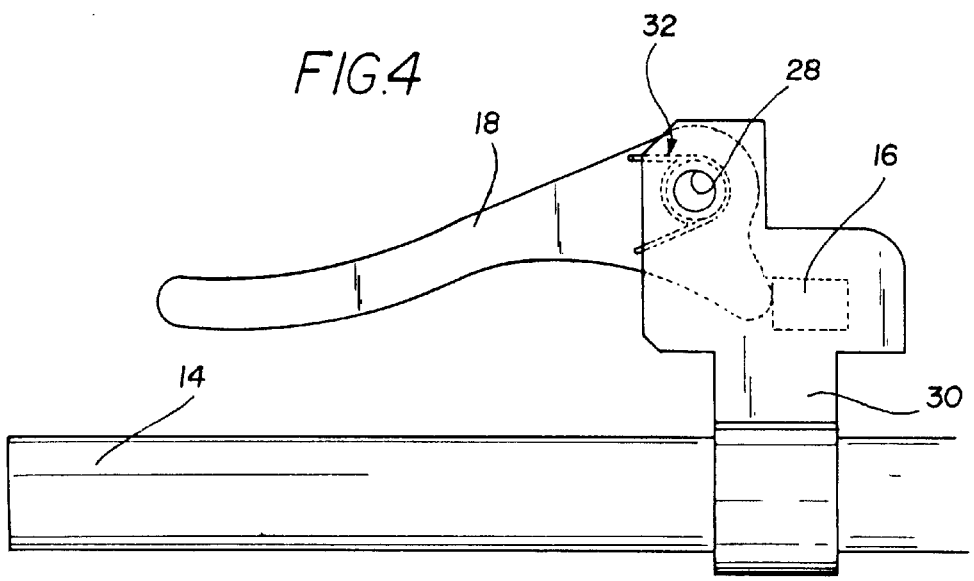
FIG. 4 is a top view of the embodiment of the present invention shown in FIG. 3.

FIGS. 3–6 show a pair of gripping levers 18 each with an arcuate outer surface 20, a planar inner surface 22 and a periphery formed therebetween. As shown in FIGS. 4 & 5, the periphery defines a thin, elongated arcuate gripping portion 24 and an engagement portion 26. Each gripping lever has a pivoting aperture 28 formed between the gripping portion and engagement portion. Such pivoting aperture is adapted for being pivotally mounted to a bracket 30. This bracket is in turn coupled to the inboard end of the grip of the snowmobile.

In operation, the inner surfaces of the gripping levers are in slidable abutment. Further, the gripping levers are each independently pivotally between a first orientation and a second orientation. In the first orientation, the gripping portion of the gripping lever is spaced from the grip and the engagement portion is out of engagement with the push button. In the second orientation, the gripping abuts the grip and the engagement portion resides in engagement with the push button for depressing the same.

FIG. 6 shows a spring assembly 32 including a pair of recesses 34 formed in the inner faces of the gripping levers. Such recesses are formed about the pivoting aperture of the gripping levers for defining a compartment. A coil spring 36 is situated within the compartment with a pair of ends each connected to a distinct one of the gripping levers. The coil spring functions for urging the gripping levers out of alignment such that one of the gripping levers is urged into the second orientation.

Next provided is a trigger assembly 38 including a pair of bores 40 formed in the gripping levers. A pin 42 is removably situated within the bores for maintaining both the gripping levers in alignment and in the first orientation thereof when not biased by a rider. Upon the rider falling off the snowmobile, a tether 44 connected between the pin and the rider removes the pin. The tether preferably takes the form of a waist band or the like. The pin preferably enters the bores from beneath the gripping levers and further has an annular detent which is adapted to snappily engage an annular indent formed in one of the gripping levers.

In an alternate embodiment the release mechanism includes a spring biased spool about which the tether is wound. A trigger assembly is associated with the spool for retracting a wire upon the spool completely unwinding. This may be accomplished in any of numerous ways. For example, the spool may be mounted on a ball screw and have a catch mounted on an end thereof. When the spool is unwound the spool and catch would move along an axis of the ball screw for engaging another catch which is attached to the wire. The wire is in turn connected to a release arm which actuates an auxiliary brake via spring action upon the wire being retracted. It should be noted that the brake associated with the present embodiment includes a flywheel with brake pads abutting the same when the release arm releases the spring. In use, the present embodiment allows a user to be distanced from the snowmobile prior to the same being immobilized.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination, a brake and a snowmobile comprising:

a snowmobile including a motorized treaded belt, a hydraulic brake precluding the movement of the treaded belt upon the actuation thereof, a handle assembly with a grip, and a spring biased push button mounted on the handle assembly adjacent to an inboard end of the grip for actuating the hydraulic brake upon the depression thereof;

a pair of gripping levers each with an arcuate outer surface, a planar inner surface and a periphery formed therebetween defining a thin, elongated arcuate gripping portion and an engagement portion, each gripping lever having a pivoting aperture formed between the gripping portion and engagement portion for being pivotally mounted to a bracket which is in turn coupled to the inboard end of the grip of the snowmobile, wherein the inner surfaces of the gripping levers are in slidable abutment and the gripping levers are each independently pivotally between a first orientation with the gripping portion spaced from the grip and the engagement portion out of engagement with the push button and a second orientation with the gripping abutting the grip and the engagement portion in engagement with the push button for depressing the same; and a spring assembly including a pair of recesses formed in the inner faces of the gripping levers about the pivoting aperture thereof for defining a compartment, and a coil spring situated within the compartment with a pair of ends each connected to a distinct one of the gripping levers for urging the gripping levers out of alignment such that one of the gripping levers is urged into the second orientation; and a trigger assembly including a pair of bores formed in the gripping levers, a pin removably situated within the bores for maintaining both the gripping levers in alignment and in the first orientation thereof, and a tether connected between the pin and a rider for removing the pin upon the rider falling off the snowmobile for braking the same.

2. In combination, a brake and a snowmobile comprising:

a snowmobile with a braking mechanism for precluding movement of the snowmobile upon the actuation thereof;

a tether worn by a rider of the snowmobile;

a release mechanism coupled to the braking mechanism and the tether for actuating the braking mechanism upon the rider inadvertently falling off the snowmobiles;

a pair of gripping levers being pivotally mounted to a grip of the snowmobile, wherein inner surfaces of the gripping levers are in slidable abutment and the gripping levers are each independently pivotally between a first orientation with the gripping portion spaced from the grip and the braking mechanism disengaged and a second orientation with the gripping levers being positioned towards the grip and the braking mechanism being actuated, the gripping levers being biased out of alignment such that one of the gripping levers is urged into the second orientation;

wherein the release mechanism includes a release pin coupled to the tether and extending through the gripping levers for allowing one of the levers to actuate the braking mechanism upon the rider inadvertently falling off the snowmobile.

3. A brake and snowmobile as set forth in claim 2 wherein the release mechanism includes a spring for urging the actuation of the braking mechanism.

4. A brake and snowmobile as set forth in claim 3 wherein the release mechanism includes a release pin for allowing the spring to urge the actuation of the braking mechanism upon the rider inadvertently falling off the snowmobile.

5. A brake and snowmobile as set forth in claim 2 wherein the release mechanism is situated on a brake lever of the snowmobile which also allows manual actuation of the braking mechanism upon the pulling thereof.

* * * * *